United States Patent [19]
Bauer et al.

[11] Patent Number: 5,817,288
[45] Date of Patent: Oct. 6, 1998

[54] PROCESS FOR TREATING A NON-DISTILLABLE HALOGENATED ORGANIC FEED STREAM

[75] Inventors: Lorenz J. Bauer, Schaumburg; Tom N. Kalnes, La Grange, both of Ill.

[73] Assignee: UOP LLC, Des Plaines, Ill.

[21] Appl. No.: 736,556

[22] Filed: Oct. 24, 1996

Related U.S. Application Data

[63] Continuation-in-part of Ser. No. 338,061, Nov. 14, 1994, abandoned.

[51] Int. Cl.$^6$ .................................................... C01B 7/01
[52] U.S. Cl. ......................... 423/481; 588/213; 588/226
[58] Field of Search .............................. 588/205, 206, 588/213, 251, 226, 228; 423/488, 481

[56] References Cited

U.S. PATENT DOCUMENTS

| | | | |
|---|---|---|---|
| 3,984,288 | 10/1976 | Yoshida et al. | 201/2.5 |
| 4,482,369 | 11/1984 | Carson et al. | 62/18 |
| 4,851,600 | 7/1989 | Louw | 585/240 |
| 5,547,653 | 8/1996 | Webster et al. | 588/213 |

OTHER PUBLICATIONS

Felder et al, Elementary Principles of Chemical Processes, TP 155.7 F44, 1978, pp. 106.

*Primary Examiner*—Wayne Langel
*Attorney, Agent, or Firm*—Thomas K. McBride; John G. Tolomei; John G. Cutts, Jr.

[57] ABSTRACT

A process for treating a non-distillable halogenated organic feed stream wherein the feed stream is contacted with a hydrogen-rich gaseous stream at hydrodehalogenation conditions to produce a carbonaceous solid containing a reduced halogen content and hydrogen halide gas. The resulting carbonaceous solid is stripped with a second hydrogen-rich gas to recover additional hydrogen halide gas and to produce a carbonaceous solid which is suitable for other uses.

13 Claims, 1 Drawing Sheet

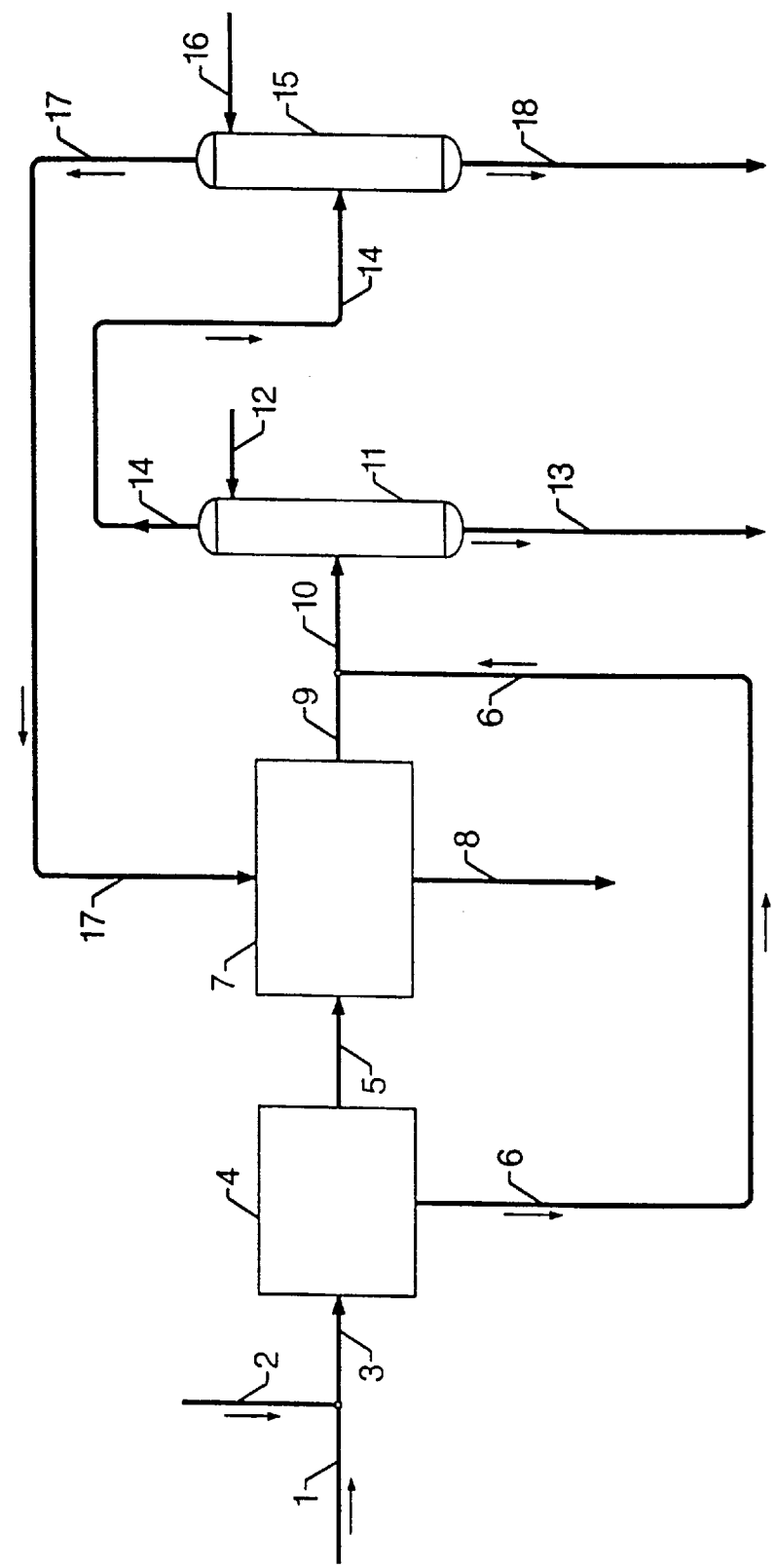

PROCESS FOR TREATING A NON-DISTILLABLE HALOGENATED ORGANIC FEED STREAM

CROSS REFERENCE TO RELATED APPLICATION

The present application is a continuation-in-part of application U.S. Ser. No. 08/338,061 filed on Nov. 14, 1994, abandoned, which is incorporated by reference.

FIELD OF THE INVENTION

The present invention relates to a process for treating a non-distillable halogenated organic feed stream to recover valuable halogen compounds and to produce a carbonaceous solid containing a reduced halogen content. More particularly, the present invention relates to contacting the nondistillable halogenated organic feed stream with a hydrogen-rich gaseous stream at hydrodehalogenation conditions to produce a carbonaceous solid containing a reduced halogen content and hydrogen halide gas. The resulting solid is stripped with a second hydrogen-rich gas to recover additional hydrogen halide gas and to produce a carbonaceous solid which is suitable for other uses.

BACKGROUND OF THE INVENTION

It is well known that by-product wastes which accumulate worldwide represent an increasing problem with regard to the environment. For many years, by-product wastes have been disposed of by land filling, for example, in abandoned pits and remote areas. For a long time, the chemical structure of wastes and their long term effects on the soil and ground water have not been given sufficient consideration. During recent years, hazardous wastes have been disposed of at special landfill sites where measures have been taken to prevent leakage of landfill contents into the ground or ground water. However, in the future, even these sites are expected to produce environmental contamination.

As a result, extensive measures have been undertaken in order to reprocess wastes and to obtain improvements with regard to environmental contamination and to produce useful products from the wastes. With the increased environmental emphasis for the treatment and recycle of non-distillable organic waste streams containing halogen, there is an increased need for improved processes to convert non-distillable organic waste streams to produce useful halide compounds and carbonaceous solids containing a reduced halogen content. For example, during the disposal or recycle of potentially environmentally harmful solid organic waste streams, an important step in the total solution to the problem is to produce product streams which may subsequently be handled in an environmentally acceptable manner. Often, in an industrial complex used to produce or process petrochemicals, there are by-product or waste streams which must be treated, converted, recycled or otherwise managed. Therefore, those skilled in the art have sought to find feasible and economical techniques to convert solid non-distillable organic waste streams containing halogen to recover usable halide compounds and innocuous carbonaceous solids.

INFORMATION DISCLOSURE

In U.S. Pat. No. 4,851,600, a process is disclosed for the destruction of waste materials comprising compounds selected from the group consisting of halogen, nitrogen, sulfur and/or oxygen compounds by thermal decomposition comprising heating the waste materials together with excess hydrogen for 1 to 10 seconds at a temperature between 700–1220° C.; quenching the gaseous effluent of the reaction and separating the effluent into a hydrocarbon and hydrogen-containing phase and a hydrogen halogenide, nitrogen-, sulfur-and/or oxygen-containing compounds phase.

U.S. Pat. No. 3,984,288 (Yoshida et al) discloses a method for the treatment of rubber and plastic wastes wherein the waste is heated, melted and extruded into a decomposing zone; the resulting molten waste is heated to a higher temperature to produce decomposed products which are passed to a dry-distilling zone to gasify the decomposed products and the dry-distilled products are cooled to produce liquid and gaseous products.

The reference "Elementary Principles of Chemical Processes" by Felder et al discloses that it is rare that a chemical reaction proceeds to completion in a continuous reactor and that the recycle of unconsumed reactant to the reactor is known.

U.S. Pat. No. 4,482,369 (Carson et al) discloses a process for the production of a hydrogen-rich gas stream from the effluent of a catalytic hydrocarbon conversion reaction zone. A hydrogen-containing vapor phase is recovered and cooled to produce a hydrogen-rich gas stream. The resulting hydrogen-rich gas stream is expanded to provide the medium used in cooling the hydrogen-containing vapor phase.

The prior art fails to disclose a process for treating a non-distillable halogenated organic feed stream to produce a recoverable halide compound and a carbonaceous solid containing a reduced halogen content.

BRIEF SUMMARY OF THE INVENTION

The invention provides a process for the production of recoverable halide compounds and a carbonaceous solid containing a reduced halogen content. The non-distillable halogenated organic feed stream is first contacted with a hydrogen-rich gaseous stream in a hydrodehalogenation zone at hydrodehalogenation conditions to produce a carbonaceous solid containing a reduced halogen content and hydrogen halide gas. This resulting carbonaceous solid is stripped with a second hydrogen-rich gaseous stream to remove residual hydrogen halide gas. The present invention provides a convenient and economical method for the recovery of hydrogen halide compounds which are produced in the hydrodehalogenation reaction zone. Important elements of the process are the ability to produce and recover useful halide compounds and to produce a carbonaceous solid containing a reduced halogen content.

One embodiment of the present invention may be characterized as a process for treating a non-distillable halogenated organic feed stream which process comprises: (a) contacting the non-distillable halogenated organic feed stream with a first hydrogen-rich gaseous stream comprising at least about 60 mol percent hydrogen in a hydrodehalogenation zone at hydrodehalogenation conditions including a pressure from about atmospheric to about 500 psig (3447 kPa gauge) and a temperature from about 572° F. (300° C.) to about 1022° F. (550° C.) to produce a carbonaceous solid containing a reduced halogen content and hydrogen halide gas; (b) stripping the carbonaceous solid containing a reduced halogen content with a second hydrogen-rich gaseous stream comprising at least about 60 mol percent hydrogen to remove residual hydrogen halide gas; and (c) recovering the hydrogen halide gas from step (a) and the residual hydrogen halide gas from step (b).

Another embodiment of the present invention may be characterized as a process for treating a non-distillable halogenated organic feed stream which process comprises: (a) contacting the non-distillable halogenated organic feed stream with a first hydrogen-rich gaseous stream comprising at least about 60 mol percent hydrogen in a hydrodehalogenation zone at hydrodehalogenation conditions including a pressure from about atmospheric to about 500 psig (3447kPa gauge) and a temperature from about 572° F. (300° C.) to about 1022° F. (550° C.) to produce a carbonaceous solid containing a reduced halogen content and a first gaseous stream comprising hydrogen halide gas; (b) stripping the carbonaceous solid containing a reduced halogen content with a second hydrogen-rich gaseous stream comprising at least about 60 mol percent hydrogen to remove residual hydrogen halide gas and produce a second gaseous stream comprising hydrogen halide gas; and (c) contacting at least a portion of the first and the second gaseous stream comprising hydrogen halide gas with an aqueous solution to produce a halogen-rich aqueous solution and a third hydrogen-rich gaseous stream having a reduced halogen content.

Yet another embodiment of the present invention may be characterized as a process for treating a non-distillable halogenated organic feed stream which process comprises: (a) contacting the non-distillable halogenated organic feed stream with a first hydrogen-rich gaseous stream comprising at least about 60 mol percent hydrogen in a hydrodehalogenation zone at hydrodehalogenation conditions including a pressure from about atmospheric to about 500 psig (3447 kPa gauge) and a temperature from about 572° F. (300° C.) to about 1022° F. (550° C.) to produce a carbonaceous solid containing a reduced halogen content and a first gaseous stream comprising hydrogen halide gas and hydrocarbonaceous compounds; (b) stripping the carbonaceous solid containing a reduced halogen content with a second hydrogen-rich gaseous stream comprising at least about 60 mol percent hydrogen to remove residual hydrogen halide gas and produce a second gaseous stream comprising hydrogen halide gas and hydrocarbonaceous compounds; (c) contacting at least a portion of the first and the second gaseous stream comprising hydrogen halide gas and hydrocarbonaceous compounds with an aqueous solution to produce a halogen-rich rich aqueous solution and a third hydrogen-rich gaseous stream comprising hydrocarbonaceous compounds and having a reduced halogen content; and (d) contacting the third hydrogen-rich gaseous stream comprising hydrocarbonaceous compounds with a sponge oil to absorb at least a portion of the hydrocarbonaceous compounds to produce a fourth hydrogen-rich gaseous Is stream having a reduced content of hydrocarbonaceous compounds.

In accordance with a preferred embodiment of the present invention, the resulting solid carbonaceous product has a halogen level below 2 weight percent which may allow burning in a conventional furnace or boiler rather than a special hazardous waste facility.

BRIEF DESCRIPTION OF THE DRAWING

The drawing is a simplified process flow diagram of a preferred embodiment of the present invention.

DETAILED DESCRIPTION OF THE INVENTION

The present invention provides a process for treating a non-distillable halogenated organic feed stream to recover valuable halogen compounds and to produce a carbonaceous solid containing a reduced halogen content.

A wide variety of solid or non-distillable halogenated organic compounds are candidates for feed streams in accordance with the process of the present invention. The petrochemical and chemical industries utilize a wide variety of chemical reactions which produce by-products or wastes which contain nondistillable halogenated organic compounds. For example, free radical chlorination reactions are used to produce various aliphatics and olefins such as vinyl chloride and chloroprene. Unfortunately, these processes are accompanied by the production of a number of by-products which are currently classified as hazardous wastes. Solid accumulations and deposits from process plants including reactors are some of the most difficult waste streams to handle in an environmentally acceptable manner. Typical wastes often contain residual chloro-organic compounds which are both toxic and flammable. These wastes are banned from landfills under current regulations. The established best available technology for disposing of these wastes is oxidation in an approved high temperature hazardous waste incinerator. However, incineration of halogenated organic compounds has been increasingly questioned because of the high energy requirements and concerns with toxic emissions. A typical feed for the process of the present invention is a granular solid containing about 60 weight percent carbon and about 35 weight percent of halogen such as chlorine, for example. Such a feed may also contain trace quantities of ash, metals, and hydrocarbonaceous compounds.

The feed to the process of the present invention is contacted with a hydrogen-rich gaseous stream in a hydrodehalogenation zone in a batch or continuous mode. Batch processing may be conducted in an autoclave or any other suitable vessel. If a continuous process is desired, a heated screw feed reactor which is capable of receiving and containing the hydrogen-rich gaseous stream is preferred. The hydrodehalogenation reaction zone is preferably operated at conditions which include a pressure from about atmospheric to about 500 psig (3447 kPa gauge) and a temperature from about 572° F. (300° C.) to about 1022° F. (550° C.). The hydrogen-rich gaseous stream which is utilized in the hydrodehalogenation reaction zone preferably contains at least 60 mol percent hydrogen. The resulting effluent from the hydrodehalogenation reaction zone contains a carbonaceous solid, hydrogen halide gas, hydrogen and trace quantities of hydrocarbonaceous compounds.

The resulting carbonaceous solid is subsequently contacted with a second hydrogen-rich gaseous stream to desorb residual hydrogen halide gas and hydrocarbonaceous compounds in order to provide essentially complete recovery of the halide gas and hydrocarbonaceous compounds. This contacting or stripping is preferably conducted at conditions which include a pressure of atmospheric to about 100 psig (689.5 kPa gauge) and a temperature from about 300° F. (149° C.) to about 750° F. (399° C.). The hydrogen-rich gaseous stream utilized to strip the carbonaceous solid preferably contains at least about 60 mol percent hydrogen.

In a preferred embodiment of the present invention, the resulting gaseous effluents from the hydrodehalogenation zone and stripping zone are contacted with an aqueous solution in order to collect the halogen. In one embodiment of the process, the aqueous solution is a lean aqueous solution of hydrogen halide where the recovery of the hydrogen halide is a desirable objective. In another embodiment where the recovery of hydrogen halide is not desired, the aqueous solution is preferably an aqueous alkaline solution containing sodium hydroxide or potassium hydroxide, for example, which neutralizes the hydrogen halide. Once the hydrogen halide has been removed from the gaseous effluents from the hydrodehalogenation reaction zone and the stripping zone, the remaining gas containing hydrogen and hydrocarbonaceous compounds is preferably contacted with a sponge oil to absorb at least a portion of the hydrocarbonaceous compounds to produce a hydrogen-rich gaseous stream containing essentially no hydrogen halide or hydrocarbonaceous compounds. A preferred sponge oil may be selected from the group consisting of kerosene and gas oil. In one preferred embodiment of the present invention, at least a portion of this hydrogen-rich gaseous stream is recycled to provide at least a portion of the hydrogen-rich gaseous stream used in the stripping step described hereinabove. In another preferred embodiment of the present invention, at least a portion of this hydrogen-rich gaseous stream is recycled to provide at least a portion of the hydrogen-rich gaseous stream used in the hydrodehalogenation zone. The resulting gaseous effluents from the hydrodehalogenation zone and stripping zone may also be treated in a refrigerated condenser in order to collect the halogen.

In the drawing, the process of the present invention is illustrated by means of a simplified flow diagram in which such details as auxiliary vessels, pumps, compressors, heat-exchange and heat-recovery circuits, and similar hardware have been deleted as being non-essential to an understanding of the techniques involved. The use of such miscellaneous equipment is well within the purview of one skilled in the art.

DETAILED DESCRIPTION OF THE DRAWING

With reference now to the drawing, a non-distillable halogenated organic feed stream is introduced into the process via conduit 1 and is admixed with a hydrogen-rich gaseous stream introduced via conduit 2. The resulting admixture is transported via conduit 3 and introduced into hydrodehalogenation zone 4. A resulting gaseous stream containing hydrogen, hydrogen halide gas and hydrocarbonaceous compounds is removed from hydrodehalogenation zone 4 via conduit 6. A carbonaceous solid containing a reduced halogen content is removed from hydrodehalogenation zone 4 via conduit 5 and is introduced into stripping zone 7. A hydrogen-rich gaseous recycle stream is transported via conduit 17 and is introduced into stripping zone 7. A carbonaceous solid containing a reduced halogen content is removed from stripping zone 7 via conduit 8 and recovered. A resulting gaseous stream containing hydrogen, hydrogen halide gas and hydrocarbonaceous compounds is removed from stripping zone 7 via conduit 9 and is admixed with a hereinabove-described gaseous stream transported via conduit 6 and the resulting gaseous admixture is introduced via conduit 10 into scrubber zone 11. An aqueous stream is introduced via conduit 12 into scrubber zone 11. An aqueous stream containing hydrogen halide removed from the upwardly flowing gas is removed from scrubber zone 11 via conduit 13 and recovered. A gaseous stream containing hydrogen and hydrocarbonaceous compounds having a reduced concentration of hydrogen halide compounds is removed from scrubber zone 11 via conduit 14 and is introduced into absorber zone 15. A sponge oil stream is transported via conduit 16 and introduced into absorber 15. A sponge oil stream containing hydrocarbonaceous compounds removed from the upwardly flowing gas in absorber zone 15 is removed from absorber zone 15 via conduit 18 and recovered. A hydrogen-rich gaseous stream is removed from absorber zone 15 via conduit 17 and is recycled as described hereinabove to stripping zone 7.

The following example is presented for the purpose of further illustrating the process of the present invention and to indicate the benefits afforded by the utilization thereof in producing a carbonaceous solid having a reduced halogen concentration.

EXAMPLE

A halogenated carbonaceous solid having the characteristics presented in Table 1 was charged to a continuous screw feed thermal reaction zone operated at hydrodehalogenation conditions including a pure hydrogen atmosphere at atmospheric pressure, a temperature of 370° C. and a residence time of 45 minutes. The hydrodehalogenation reaction zone yielded a product stream containing 24.1 weight percent hydrogen chloride, 75.8 weight percent carbonaceous solid and 0.1 weight percent hydrocarbonaceous compounds.

The resulting carbonaceous solid containing 4.6 weight percent hydrogen chloride was introduced into a stripping zone purged with pure hydrogen at a gas to solid ratio of 100 n liters of hydrogen per liter of solid, at atmospheric pressure and a temperature of 225 ° C. The resulting effluent from the stripping zone was a carbonaceous solid containing a reduced concentration of halogen and hydrocarbonaceous compounds. The stripping gas containing hydrogen chloride and trace quantities of hydrocarbonaceous compounds was scrubbed with an aqueous sodium hydroxide solution to recover the chloride and then scrubbed with toluene to absorb the trace quantities of hydrocarbonaceous compounds.

The overall yields produced as described hereinabove are presented in Table 2.

TABLE 1

| HALOGENATED CARBONACEOUS SOLID FEEDSTOCK ANALYSIS | |
|---|---|
| Particle size, mm | <1 |
| Bulk density, g/cc | 0.4 |
| Heptane Insoluble, weight percent | 98 |
| Elemental Composition, weight percent | |
| Carbon | 62 |
| Hydrogen | 2.5 |
| Chloride | 35 |
| Ash | <0.5 |

TABLE 2

| PRODUCT YIELDS | |
|---|---|
| Hydrogen Chloride, weight percent | 27.6 |
| Hydrocarbonaceous Compounds, weight percent | 0.1 |
| Carbonaceous Solid, weight percent | 72.3 |

The foregoing description, drawing and example clearly illustrate the advantages encompassed by the method of the present invention and the benefits to be afforded with the use thereof.

What is claimed:

1. A process for treating a non-distillable halogenated organic feed stream which process comprises:

(a) contacting said non-distillable halogenated organic feed stream with a first hydrogen-rich gaseous stream comprising at least about 60 mol percent hydrogen in a hydrodehalogenation zone at hydrodehalogenation conditions including a pressure from about atmospheric to about 500 psig (3447kPa gauge) and a temperature from about 572° F. (300° C.) to about 1022° F. (550° C.) to produce a carbonaceous solid containing a reduced halogen content and hydrogen halide gas;

(b) stripping said carbonaceous solid containing a reduced halogen content with a second hydrogen-rich gaseous stream comprising at least about 60 mol percent hydrogen to remove residual hydrogen halide gas; and (c) recovering said hydrogen halide gas from step (a) and said residual hydrogen halide gas from step (b).

2. The process of claim 1 wherein said non-distillable halogenated organic feed stream comprises solid waste.

3. The process of claim 1 wherein said hydrogen halide gas is recovered in a refrigerated condenser.

4. A process for treating a non-distillable halogenated organic feed stream which process comprises:

(a) contacting said non-distillable halogenated organic feed stream with a first hydrogen-rich gaseous stream comprising at least about 60 mol percent hydrogen in a hydrodehalogenation zone at hydrodehalogenation conditions including a pressure from about atmospheric to about 500 psig (3447kPa gauge) and a temperature from about 572° F. (300° C.) to about 1022° F. (550° C.) to produce a carbonaceous solid containing a reduced halogen content and a first gaseous stream comprising hydrogen halide gas;

(b) stripping said carbonaceous solid containing a reduced halogen content with a second hydrogen-rich gaseous stream comprising at least about 60 mol percent hydrogen to remove residual hydrogen halide gas and produce a second gaseous stream comprising hydrogen halide gas; and (c) contacting at least a portion of said first and said second gaseous stream comprising hydrogen halide gas with an aqueous solution to produce a halogen-rich aqueous solution and a third hydrogen-rich gaseous stream having a reduced halogen content.

5. The process of claim 4 wherein said non-distillable halogenated organic feed stream comprises solid waste.

6. The process of claim 4 wherein said aqueous solution is a lean hydrogen halide solution.

7. The process of claim 4 wherein said aqueous solution is an alkaline solution.

8. A process for treating a non-distillable halogenated organic feed stream which process comprises:

(a) contacting said non-distillable halogenated organic feed stream with a first hydrogen-rich gaseous stream comprising at least about 60 mol percent hydrogen in a hydrodehalogenation zone at hydrodehalogenation conditions including a pressure from about atmospheric to about 500 psig (3447 kPa gauge) and a temperature from about 572° F. (300° C.) to about 1022° F. (550° C.) to produce a carbonaceous solid containing a reduced halogen content and a first gaseous stream comprising hydrogen halide gas and hydrocarbonaceous compounds;

(b) stripping said carbonaceous solid containing a reduced halogen content with a second hydrogen-rich gaseous stream comprising at least about 60 mol percent hydrogen to remove residual hydrogen halide gas and produce a second gaseous stream comprising hydrogen halide gas and hydrocarbonaceous compounds;

(c) contacting at least a portion of said first and said second gaseous stream comprising hydrogen halide gas and hydrocarbonaceous compounds with an aqueous solution to produce a halogen-rich aqueous solution and a third hydrogen-rich gaseous stream comprising hydrocarbonaceous compounds and having a reduced halogen content; and (d) contacting said third hydrogen-rich gaseous stream comprising hydrocarbonaceous compounds with a sponge oil to absorb at least a portion of said hydrocarbonaceous compounds to produce a fourth hydrogen-rich gaseous stream having a reduced content of hydrocarbonaceous compounds.

9. The process of claim 8 wherein said non-distillable halogenated organic feed stream comprises solid waste.

10. The process of claim 8 wherein said aqueous solution is a lean hydrogen halide solution.

11. The process of claim 8 wherein said aqueous solution is an alkaline solution.

12. The process of claim 8 wherein said sponge oil is selected from the group consisting of kerosene and gas oil.

13. The process of claim 8 wherein at least a portion of said fourth hydrogen-rich gaseous stream is recycled to provide at least a portion of said second hydrogen-rich gaseous stream in step (b).

* * * * *